(12) United States Patent
Ogawa

(10) Patent No.: US 7,942,567 B2
(45) Date of Patent: May 17, 2011

(54) EXTRUDER SYSTEM WITH INTEGRATED GEAR PUMP

(75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 979 days.

(21) Appl. No.: 10/586,475

(22) PCT Filed: Dec. 24, 2004

(86) PCT No.: PCT/JP2004/019385
§ 371 (c)(1),
(2), (4) Date: Jul. 3, 2007

(87) PCT Pub. No.: WO2005/068837
PCT Pub. Date: Jul. 28, 2005

(65) Prior Publication Data
US 2007/0264144 A1 Nov. 15, 2007

(30) Foreign Application Priority Data
Jan. 19, 2004 (JP) .................................. 2004-010882

(51) Int. Cl.
*B29B 7/42* (2006.01)

(52) U.S. Cl. ......................................... 366/77; 366/272

(58) Field of Classification Search ................. 366/77, 366/272
See application file for complete search history.

(56) References Cited

U.S. PATENT DOCUMENTS

| 1,595,470 A | * | 8/1926 | Johnson ......................... 425/191 |
| 2,785,438 A | * | 3/1957 | Willert .............................. 366/81 |
| 4,336,213 A | * | 6/1982 | Fox ............................... 264/40.1 |
| 5,156,781 A | | 10/1992 | Bohm et al. |
| 5,267,847 A | | 12/1993 | Bohm et al. |
| 6,468,067 B1 | * | 10/2002 | Ikegami ........................ 425/209 |
| 6,799,881 B2 | * | 10/2004 | Fischer ............................ 366/80 |
| 7,354,188 B2 | * | 4/2008 | Uphus et al. ..................... 366/77 |
| 2004/0151058 A1 | * | 8/2004 | Schafer et al. ................... 366/77 |

FOREIGN PATENT DOCUMENTS

| EP | 1 409 223 B1 | 4/2004 |
| JP | A 5-116200 | 5/1993 |
| JP | A 2000-34985 | 2/2000 |
| JP | A 2001-241386 | 9/2001 |
| WO | WO 03/011561 A1 | 2/2003 |

* cited by examiner

*Primary Examiner* — David L Sorkin
(74) *Attorney, Agent, or Firm* — Oliff & Berridge, PLC

(57) ABSTRACT

An extruder system includes an extruder for axially extruding a rubber or plastic material in a barrel. A gear pump adjusts an amount of extruded material that is discharged by engagement of gears. The gear pump includes a driving pinion and a driven pinion engaged with, and driven by, the driving pinion. A gear casing accommodates the pinions and includes side plates on both axial sides of the pinions. A casing body is arranged between the side plates and encloses a space on a radially outer side of the pinions. The side plate includes a suction side plate that has a suction port arranged opposite to that side of engagement region between the pinions and a discharge side plate that has a discharge port arranged opposite to that side of engagement region between the pinions. The suction and discharge ports are maintained out of axial communication with each other.

4 Claims, 7 Drawing Sheets

Prior Art

EXTRUDER SYSTEM WITH INTEGRATED GEAR PUMP

TECHNICAL FIELD

The present invention relates to an extruder system with an integrated gear pump, applicable for measuring and extruding a predetermined amount of rubber or plastic material, and contemplates to provide a compact arrangement of such an extruder.

BACKGROUND ART

In order to extrude a constant amount of rubber or plastic material, it has been a conventional practice to use a combined system wherein a gear pump is arranged on a downstream side of an extruder, and to drive the gear pump independently from the extruder. However, such a combined system requires considerable space for installation. Thus, there has been proposed an extruder system provided with a gear pump, wherein the drive shaft for the extrusion screw is simultaneously used to drive the gear pump. Attention is drawn, e.g., to the pamphlet of International Publication WO 2003/011561.

FIG. 1 is a fragmentary longitudinal-sectional view showing the known extruder system in a plane including the rotational axis of the extrusion screw, and FIG. 2 is a cross-sectional view taken along the line II-II in FIG. 1. The extruder system 80 includes an extruder 81 for axially extruding a rubber or plastic material G in a barrel 83 by rotation of an extrusion screw 82 arranged in the barrel, and a gear pump 91 driven by a rotational force for rotating the extrusion screw 82 so that a predetermined amount of the material G extruded from the extruder is discharged by engagement of gears. The gear pump 91 includes a casing 93 that is secured to the barrel 83, a ring gear 94 fixedly secured to the radially inner side of the casing 93, and a rotatable wall body 85 secured to the extrusion screw 82.

The rotatable wall body 85 includes two side plates 85a, 85b extending perpendicularly to the rotational axis of the extrusion screw 82, and partition walls 85c for dividing the space between the side plates 85a, 85b in the circumferential direction, for example, into four chambers 87 as shown. Each chamber 87 is provided therein with a planetary pinion 86 that is rotatable about an axis in parallel with the rotational axis of the extrusion screw 82. Each planetary pinion 86 is arranged so as to divide the chamber 87 into a suction sub-chamber and a discharge sub-chamber, and meshed with the ring gear 94. Thus, when the extrusion screw 82 is rotated, the rotatable wall body 85 is rotated to cause an orbital revolution of the planetary pinions 86. On this occasion, being meshed with the ring gear 94, the planetary pinions 86 undergo a planetary rotation in a direction opposite to the direction of the orbital revolution.

Among the two side plates 85a, 85b, the side plate 85a is situated on the suction side adjacent to the extrusion screw 82, and the side plate 85b is situated on the discharge side remote from the extrusion screw 82. The side plate 85a on the suction side is formed with suction ports 88a which are in communication with the respective suction sub-chambers 87a, while the side plate 85b on the discharge side is formed with discharge ports 88b which are in communication with the respective discharge sub-chambers 87b.

In operation of the known extruder system 80 described above, the material G extruded by the rotation of the extrusion screw 82 is passed through the suction port 88a in the side plate 85a on the suction side, fed into the radially outer side of the suction sub-chamber 87a, and forced into the gap between the neighboring teeth of the planetary pinions 86. As the planetary pinion 86 undergoes planetary rotation, while being retained in the gap between the neighboring teeth of the planetary pinion 86, the material G is successively moved to the radially inner side of the suction sub-chamber 87a, the radially inner side of the discharge sub-chamber 87a, and the radially outer side of the discharge sub-chamber 87a. When the material G reaches the radially outermost position in the discharge sub-chamber 87b, where the planetary pinion 86 comes into engagement with the ring gear 94, the material G is discharged through the discharge port 88b toward the axial tip end of the extruder system, due to the engagement between the planetary pinion 86 and the planetary pinion 86. On the other hand, the gap of the planetary pinion 86, from which the material has been discharged, is moved to the suction sub-chamber 87a so as to be filled with a new batch of the extruded material G In this way, the volume of the material G that can be discharged by advancement of the planetary pinion 86 by one pitch is determined by the teeth profile of the planetary pinion 86, and it is possible to maintain a constant discharge volume of the material G by maintaining the rotational speed of the extrusion screw 82 constant.

DISCLOSURE OF THE INVENTION

Task to be Solved by the Invention

The known extruder system 80 described above is considered to be generally satisfactory in terms of its basic functions, though the following problems may be encountered. First of all, the extruder system 80 is limited in its application in view of a poor response characteristic, which is noticeable particularly when the operation of the extruder system 80 is started or stopped, or when the discharge volume of the material G is controlled in a real-time manner by continuously changing the rotational speed of the extrusion screw. This is due to a large inertia of the rotating elements as a whole, inclusive of the rotatable wall body 85 and the planetary pinions 86 which are rotated together with the extrusion screw 82.

A second problem is that the known extruder system 80 as a whole is highly costly due to a particular arrangement wherein the planetary rotation force of the planetary pinions 86 for transferring the extruded material G is generated by the orbital revolution of the planetary pinions in engagement with the ring gear 94, given that the ring gear 94 has to be formed with precisely machined internal teeth and is thus very expensive.

A third problem of the known extruder system 80 is that, in order to increase the discharge volume of the system by increasing the rotational speed of the planetary pinions 86, the ring gear 92 must have a large diameter. This not only results in increased dimension and cost of the gear pump section, but also necessitates that the engagement region of the gear teeth to be fed with the material G from the extrusion screw 82 be shifted to the radially outer side of the gear pump with an increased dimension. In order to smoothly guide the material G from the tip end of the extrusion screw 82 to the suction port 88a, from a practical viewpoint, it is necessary to increase the diameter of the extrusion screw 82 at its tip end, with the result that the production cost of the extrusion screw also increases.

A fourth problem is that it is difficult to effectively cool the material G which generates heat within the gear pump 91 of the known extrusion system 80. In the absence of effective cooling of the material G, it is necessary to suppress the discharge volume in order to prevent scorching of the material G. Heat generation of the material G occurs mainly as a result of its friction with the surrounding wall surface. In the case of the known extrusion system, such friction takes place in the radially inner region of the chamber 87. Thus, in order to achieve an effective cooling, it would be necessary to supply coolant through a cooling jacket which extends through the wall body 85. However, since the wall body 85 itself undergoes rotation during the operation of the extrusion system, the cooling jacket would be very complicated in structure.

The present invention has been achieved in view of these problems of the prior art. It is therefore an object of the present invention to provide an extruder system comprising a gear pump, which is excellent in response characteristics in operation, which can be realized at low cost, and which is capable of cooling the material.

Measures for Solving the Task (1) A first aspect of the present invention resides in an extruder system with a gear pump, comprising an extruder for axially extruding a rubber or plastic material in a barrel by rotation of an extrusion screw arranged in the barrel, and a gear pump driven by a rotational force for rotating the extrusion screw so that a predetermined amount of the material extruded from the extruder is discharged by engagement of gears. The gear pump comprises a driving pinion arranged coaxially to the extrusion screw and fixedly secured to a tip end of the extrusion screw, at least one driven pinion meshed with, and driven by the driving pinion and rotatable about a rotational shaft that is parallel to a rotational shaft of the extrusion screw, and a gear casing accommodating these pinions therein. The gear casing comprises side plates arranged on both axial sides of the pinions leaving a small clearance therefrom, and extending perpendicularly to the rotational shaft of the extrusion screw, and a casing body arranged between the side plates and enclosing a space on a radially outer side of the pinions. The rotational shaft of the driven pinion is fixedly secured to the side plates. The side plates include a side plate situated on the suction side adjacent to the extrusion screw and a side plate situated on the discharge side remote from the extrusion screw. The side plate on the suction side has a suction port that is arranged opposite to that side of engagement region between the driving pinion and the driven pinion, where their teeth are being disengaged from each other. The side plate on the discharge side has a discharge port that is arranged opposite to that side of the engagement region between the driving pinion and the driven pinion, where their teeth are being engaged from each other. The suction port and the discharge port are maintained out of an axial communication with each other by said pinions.

(2) A second aspect of the present resides in an extruder system according to the first aspect, wherein the teeth of the driving pinion and the driven pinion are comprised of bevel gear teeth.

(3) A third aspect of the present invention resides in an extruder system according to the first or second aspect, wherein the side plate on the suction side and the side plate on the discharge side are formed with recesses for preventing jamming of the material, are these recesses are situated at locations on those side of the suction port and the discharge port, which are adjacent to the engagement region of the driving pinion and the driven pinion, respectively.

(4) A fourth aspect of the present invention resides in an extruder system according to any one of the first to the third aspects, wherein the casing includes a cooling jacket.

EFFECTS OF THE INVENTION

With the features of the present invention in its first aspect, the material extruded axially from the tip end of the extrusion screw is forced into the gap between the neighboring teeth of the driven pinion, at a location adjacent to the engagement region between the driving pinion and the driven pinion, and is subsequently once moved away from the center axis of the driving pinion and then toward the center axis of the driving pinion so as to be discharged at a location adjacent to the engagement region between the driving pinion and the driven pinion. Therefore, the following advantages are achieved.

First, since it is only the driving pinion, which is secured to, and rotatable with the extrusion screw, the rotating elements in the extruder system has a low inertia to ensure an excellent response characteristic.

Second, since a ring gear with internal teeth is not required, it is possible to reduce the cost.

Third, since the material suction port is situated adjacent to the engagement region between the driving pinion and the driven pinion, and at least closer to the driving pinion than the center axis of the driven pinion, it is unnecessary to enlarge the diameter of the extrusion screw at its tip end, and possible to further reduce the cost.

Fourth, even though friction causing heat generation occurs between the material and the casing, the stationary casing is provided with a cooling jacket to effectively cool the material and prevent scorching of the material.

With the features of the present invention in its second aspect, since the teeth of the driving pinion and the driven pinion are comprised of bevel gear teeth, it is possible, during the rotation of these pinions, to generate a force having a component effective to advance the material axially toward the tip end side, thereby allowing efficient suction and discharge of the material.

With the features of the present invention in its third aspect, since the side plates are formed with recesses for preventing jamming of the material, it is possible to avoid a situation wherein the material leaks into the engagement region thereby causing forced deformation of the pinions, and also to avoid leakage of the material from the suction side to the discharge side, thereby improving a material metering accuracy.

With the features of the present invention in its fourth aspect, since the casing is provided with a cooling jacket, it is possible to prevent abnormal elevation in temperature of the material, and suppress scorching of the material and deterioration in terms of the material quality.

BEST MODE FOR CARRYING OUT THE INVENTION

Figure 1:
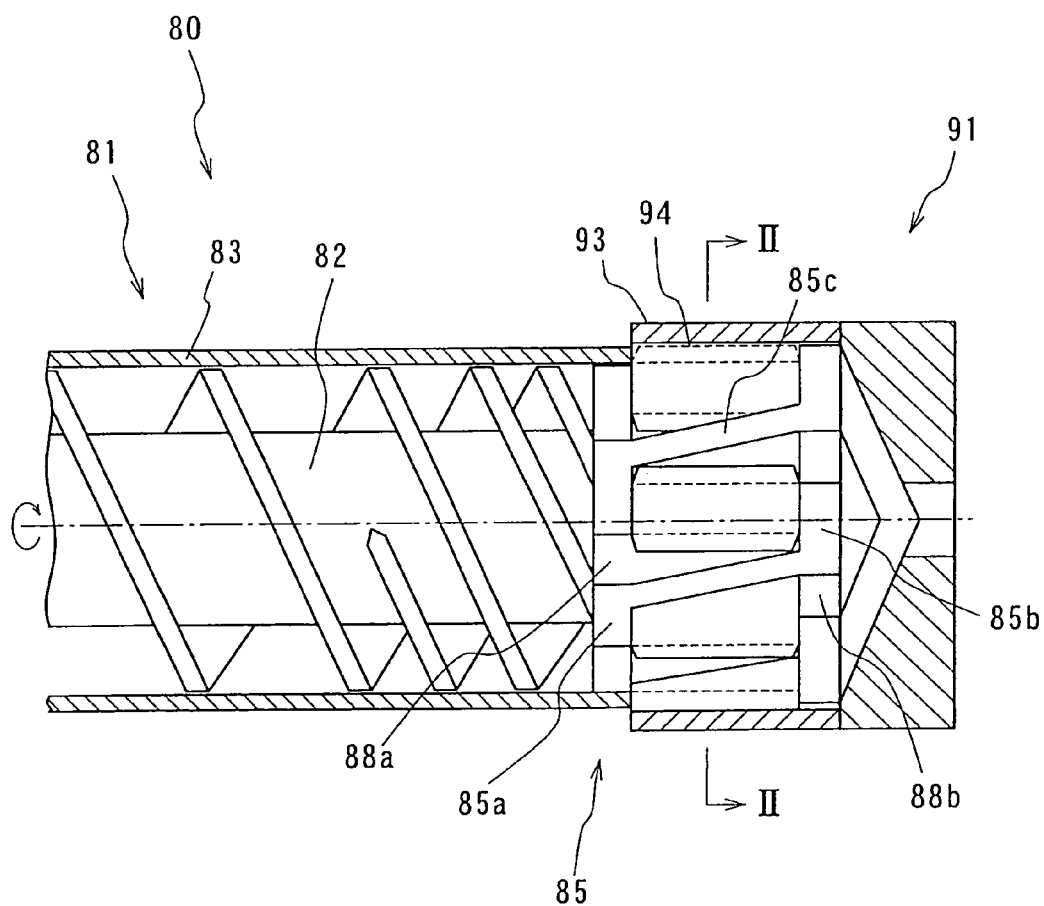
FIG. 1 is a fragmentary longitudinal-sectional view showing the known extruder system in a plane including the rotational axis of the extrusion screw.
Figure 2:
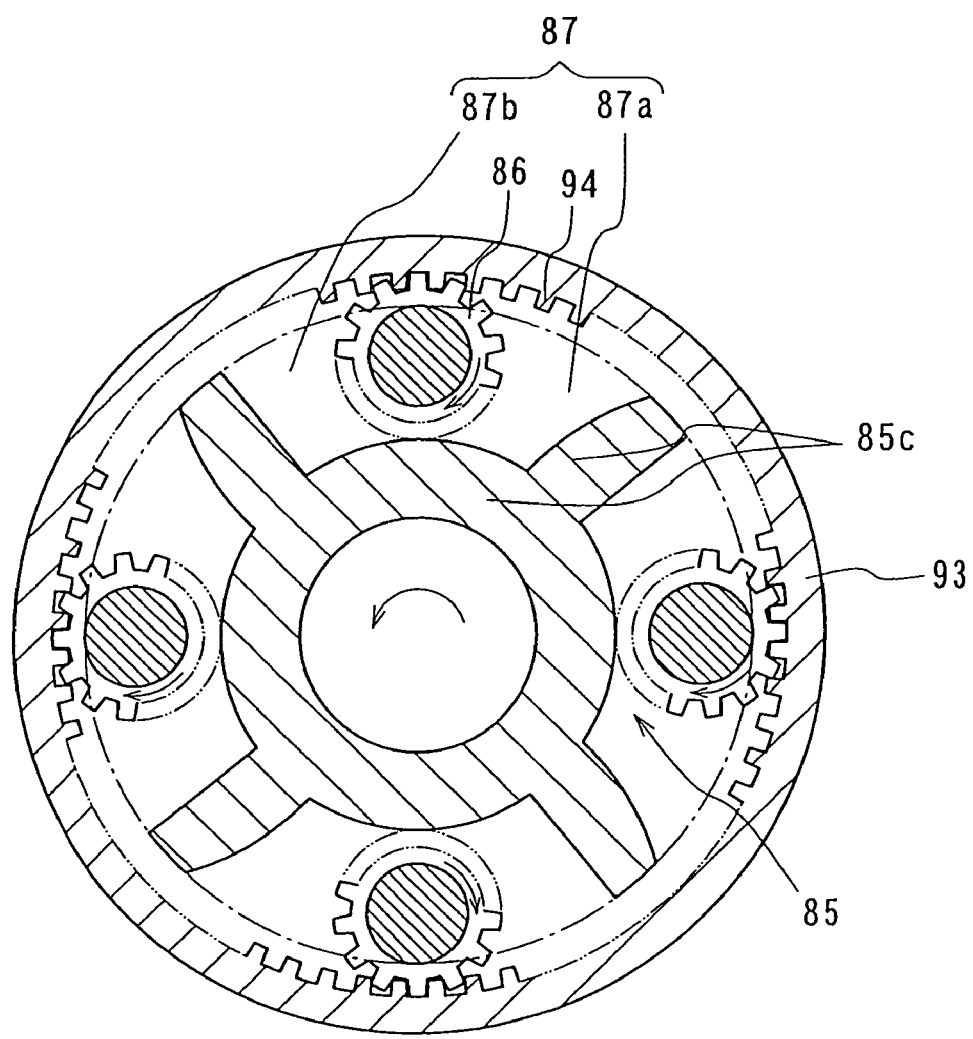
FIG. 2 is a cross-sectional view taken along the line II-II in FIG. 1.
Figure 3:
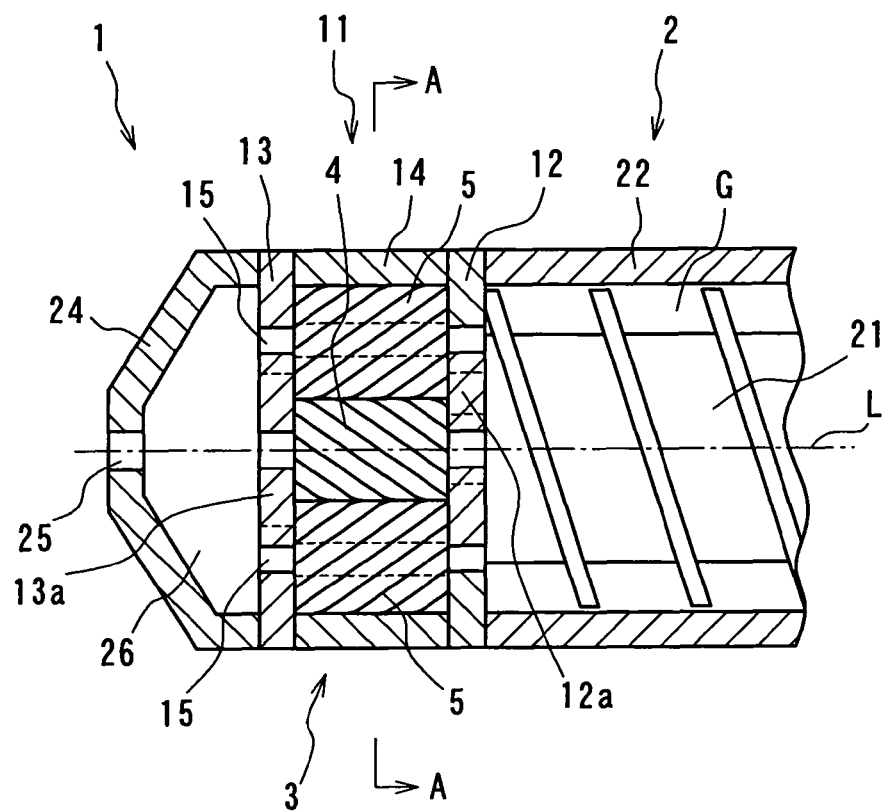
FIG. 3 is a fragmentary longitudinal-sectional view showing the extruder system according to an embodiment of the present invention, the section being taken in a plane including the rotational axis of the extrusion screw.
Figure 4:
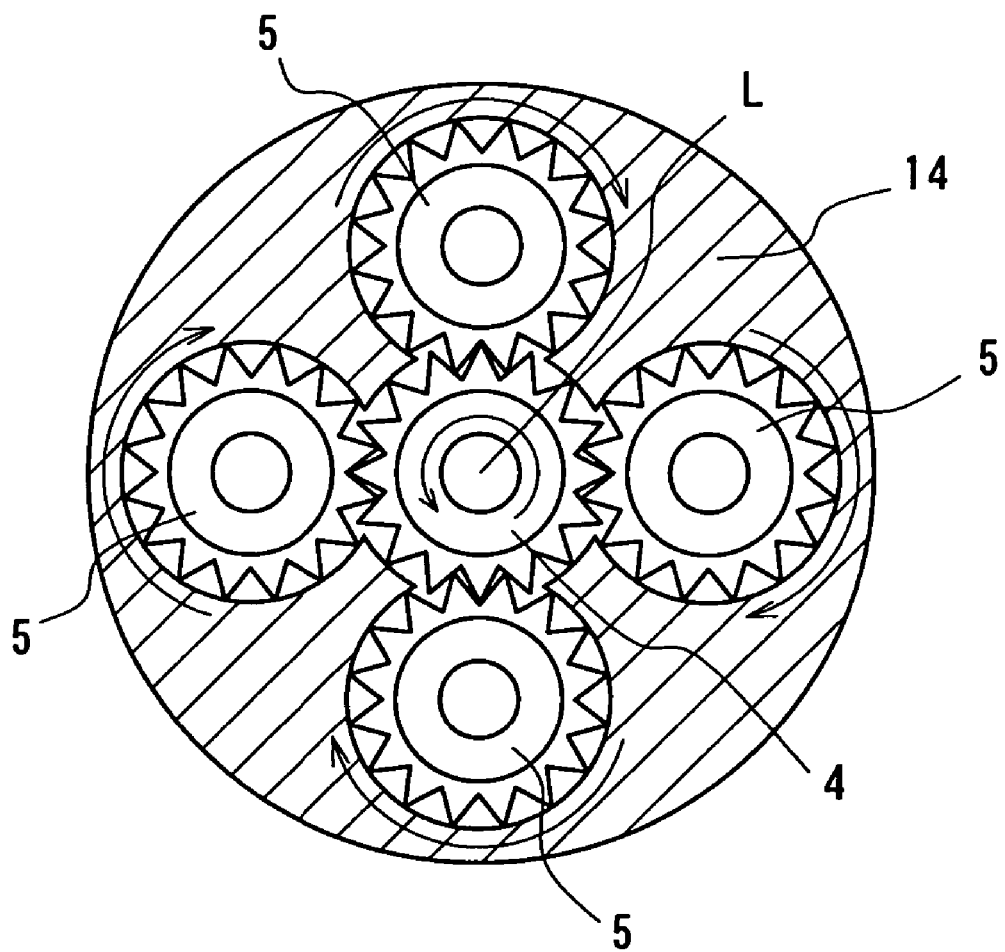
FIG. 4 is a cross-sectional view taken along the line A-A in FIG. 3.
Figure 5:
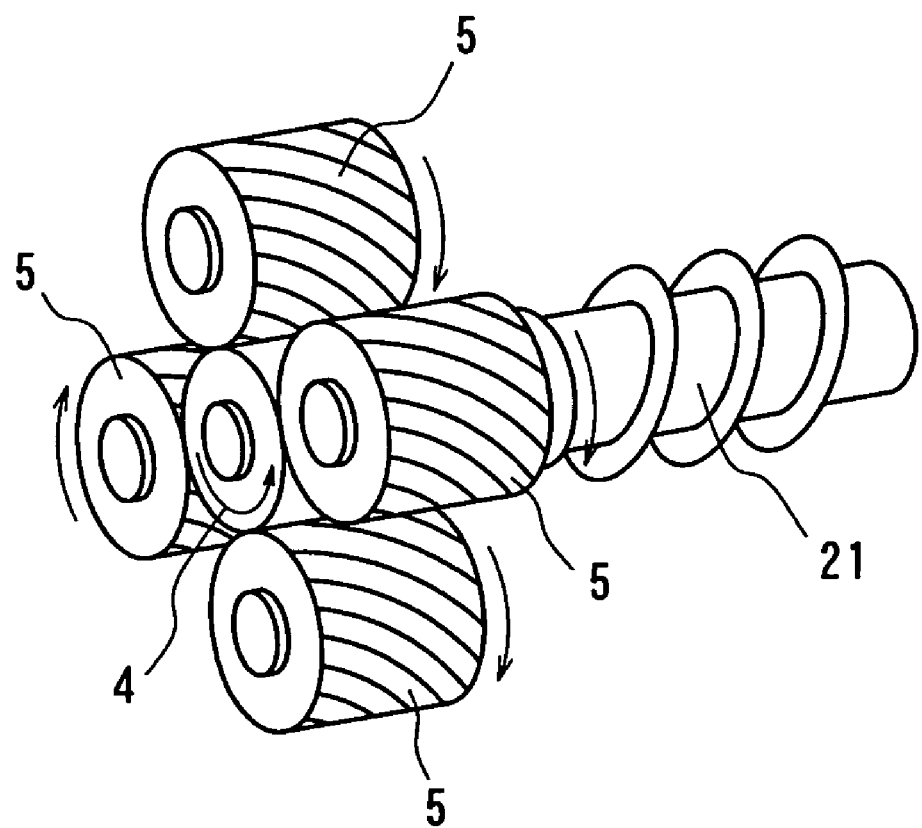
FIG. 5 is a perspective view showing the engagement of driving and driven pinions.
Figure 6:
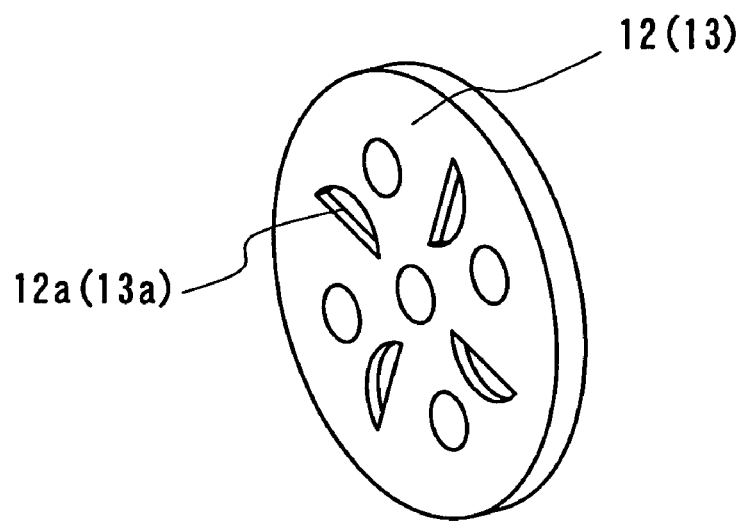
FIG. 6 is a perspective view of the side plate.
Figure 7:
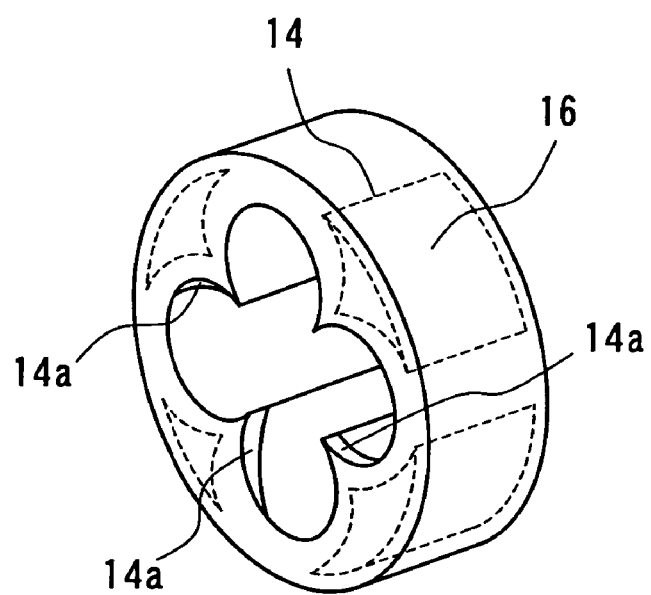
FIG. 7 is a perspective view of the casing.
Figure 8:
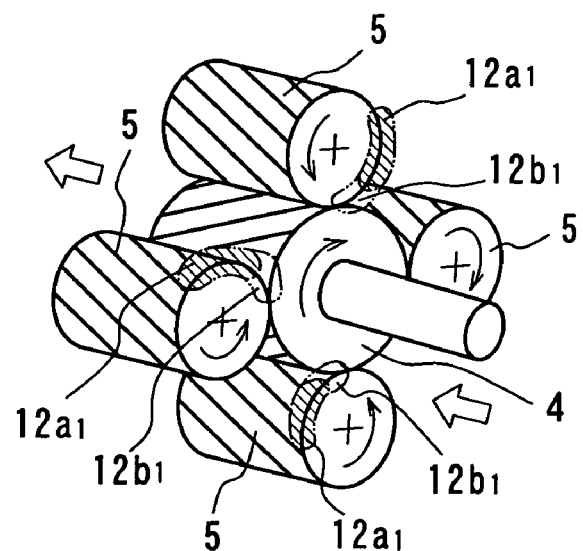
FIGS. 8(a) and 8(b) are perspective views showing the locations of the openings and the recesses as being associated with the pinions.
Figure 8:
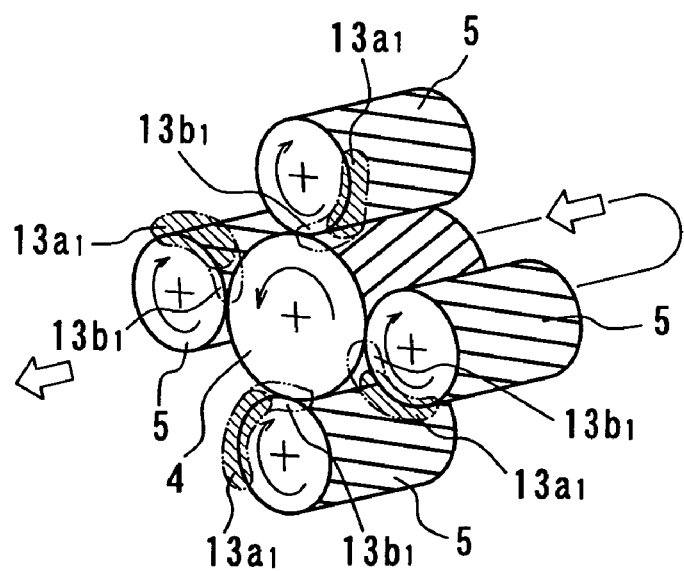

A preferred embodiment of the present invention will be described below with reference to the drawings, wherein FIG. 3 is a fragmentary longitudinal-sectional view showing the extruder system according to the embodiment of the present invention, the section being taken in a plane including the rotational axis of the extrusion screw; FIG. 4 is a cross-sectional view taken along the line A-A in FIG. 3; FIG. 5 is a perspective view showing the engagement of driving and driven pinions; FIG. 6 is a perspective view of the side plate; FIG. 7 is a perspective view of the casing; and FIGS. 8(a) and 8(b) are perspective views showing the locations of the openings and the recesses as being associated with the pinions. The following description refers to the material to be extruded as being a rubber, though the description applies equally to plastic materials as well.

The extruder system with integrated gear pump according to the invention, which is designated as a whole by reference numeral 1, includes an extruder 2 that comprises an extrusion screw 21 and a barrel 22 accommodating the extrusion screw 21 so that a rubber G within the barrel 22 is extruded in the axial direction under the rotation of the extrusion screw 21, as well as a gear pump 3 that is driven by a rotational force for rotating the extrusion screw 21 so as to discharge a constant volume of the extruded rubber G by engagement of the gear teeth.

The gear pump 3 includes a driving pinion 4 which is arranged coaxially to the extrusion screw 21 and fixedly secured to a tip end of the extrusion screw 21, at least one driven pinion 5 engaged with, and driven by the driving pinion 4 so as to rotate about a shaft that is parallel to the rotational axis L of the driving pinion 4, and a gear casing 11 fixedly secured to the barrel 22 to accommodate these pinions therein.

The gear casing 11 includes side plates 12, 13 arranged on both axial sides of the pinions 4, 5 leaving a small clearance therefrom, and extending perpendicularly to the rotational axis L of the extrusion screw, and a casing body 14 arranged between the side plates 12, 13 and enclosing a space on a radially outer side of the pinions 4, 5. The driven pinion 4 has a rotary shaft 15 which is fixedly secured to the side plates 12, 13. Among the side plates 12, 13, the side plate 12 situated on the suction side adjacent to the extrusion screw 21 has a suction port 12a that is arranged opposite to that side of engagement region between the driving pinion 4 and the driven pinion 5, where their teeth are being disengaged from each other. The side plate 13 situated on the discharge side remote from the extrusion screw 21 has a discharge port 13a that is arranged opposite to that side of the engagement region between the driving pinion 4 and the driven pinion 5, where their teeth are being engaged from each other. The suction port 12a and the discharge port 13a are maintained out of an axial communication with each other by the pinions 4, 5.

Furthermore, a discharge head 24 having a mouthpiece orifice 25 is secured to the side plate 13 on the discharge side, on its side that is remote from the extrusion screw 21. The discharge head 24 cooperates with the side plate 13 to define a straightening chamber 26 for the rubber G In the extruder system 1 having a construction as described above, the rubber G extruded axially from the tip end of the extrusion screw 21 under the rotation thereof is guided into the gear casing 11 through the suction port 12a in the side plate 12, and forced into the gap between the neighboring teeth of the driven pinion 5. As the driven pinion undergoes a planetary rotation, the rubber G is once moved away from the driving pinion 4 to pass the radially outermost region in the gear casing 11, and then moved back toward the driving pinion 5. When the gap of the driven pinion 5 filled with the rubber G reaches an engagement region between the driven pinion 5 and the driving pinion 4, the rubber G is removed out of the gap due to the progressive engagement of the pinions 4, 5. The removed rubber G is discharged out of the gear casing 11 through the discharge port 13a, supplied into the straightening chamber 26, and then extruded from the mouthpiece orifice 25 with a constant cross-sectional shape.

As shown in FIG. 7, the casing body 14 is provided with recesses 14a at locations adjacent to the suction ports 12a and the discharge ports 13a in the side plates 12, 13, for allowing a smooth passage of the rubber G FIG. 8(a) is a perspective view showing the locations of the suction ports 12a and the recesses for preventing jamming of the rubber G as being associated with the pinions, wherein reference numeral 12a1 denotes the portions corresponding to the suction ports 12a, and 12b1 denotes the portions corresponding to the recesses for preventing jamming of the rubber G. Similarly, FIG. 8(b) is a perspective view showing the locations of the discharge ports 13a and the recesses for preventing jamming of the rubber G, as being associated with the pinions, wherein reference numeral 13a1 denotes the portions corresponding to the discharge ports 13a, and 13b1 denotes the portions corresponding to the recesses for preventing jamming of the rubber G.

The extruder system 1 having a construction as described above, is capable of achieving the following advantages. First, in the gear pump 11, since it is only the driving pinion 4, which is secured to, and rotatable with the extrusion screw 21, the rotating elements in the extruder system has a low inertia to ensure an excellent response characteristic. Second, since the driven pinions 5 for transferring the rubber G from the suction side to the discharge side is directly engaged with, and driven by the driving pinion 4, an expensive ring gear is not required. Third, since the suction port 12a is situated immediately on the outer side of the driving pinion 4, it is unnecessary to enlarge the diameter of the extrusion screw 21 at its tip end. Fourth, in connection with the casing body 14 fixedly secured to the barrel 22, which undergoes a friction with the rubber G, when it is desired to suppress heat generation of the rubber G a cooling jacket 16 may be readily provided, as shown in FIG. 7.

Preferably, the teeth of the driving pinion 4 and the driven pinion 5 are comprised of bevel gear teeth, in order to efficiently achieve the suction and discharge of the rubber G.

The invention claimed is:

1. An extruder system with a gear pump, comprising an extruder for axially extruding a rubber or plastic material in a barrel by rotation of an extrusion screw arranged in the barrel, and a gear pump driven by a rotational force for rotating the extrusion screw so that a predetermined amount of the material extruded from the extruder is discharged by engagement of gears, wherein:

the gear pump comprises
a driving pinion arranged coaxially to the extrusion screw and fixedly secured to a tip end of the extrusion screw,
at least one driven pinion meshed with, and driven by the driving pinion and rotatable about a rotational shaft that is parallel to a rotational shaft of the extrusion screw, and a gear casing housing the driving pinion and the at least one driven pinion;

the gear casing comprises side plates arranged on both axial sides of the driving pinion and the at least one driven pinion leaving a small clearance from the driving pinion and the at least one driven pinion, and extending perpendicularly to the rotational shaft of the extrusion screw, and a casing body arranged between the side plates and enclosing a space on a radially outer side of the driving pinion and the at least one driven pinion, the casing body comprising a plurality of axial opening portions, each axial opening portion housing a respective pinion selected from a group consisting of the driving pinion and the at least one driven pinion, the each opening portion substantially conforming in size and shape to an outer circumferential profile of the respective pinion such that a space on the radially outer side of the respective pinion is minimized so that the predetermined amount of material extruded flows between teeth of each respective pinion in operation;

the rotational shaft of the at least one driven pinion is fixedly secured to the side plates;

the side plates include a side plate situated on the suction side adjacent to the extrusion screw and a side plate situated on the discharge side remote from the extrusion screw, the side plate on the suction side having a suction port that is arranged opposite to that side of an engagement region between the driving pinion and the at least one driven pinion, where teeth of the driving pinion and the at least one driven pinion are being disengaged from each other, and the side plate on the discharge side having a discharge port that is arranged opposite to that side of the engagement region between the driving pinion and the at least one driven pinion, where the teeth of the driving pinion and the at least one driven pinion are being engaged from each other, the suction port and the discharge port being maintained out of an axial communication with each other by the driving pinion and the at least one driven pinion, and the casing body further comprises a plurality of recesses positioned at each axial end of at least one of the plurality of axial opening portions, the plurality of recesses being partially non-overlapping with the suction port and the discharge port.

2. The extruder system according to claim 1, wherein the teeth of said driving pinion and said driven pinion are comprised of bevel gear teeth.

3. The extruder system according to claim 1, wherein said casing includes a cooling jacket.

4. The extruder system according to claim 2, wherein said casing includes a cooling jacket.

* * * * *